Sept. 26, 1967 D. W. SEIDLER 3,343,663

PACKAGE AND LAMINATE THEREOF

Filed Oct. 24, 1965

INVENTOR.
Don W. Seidler
BY
Robert B. Ingraham
AGENT

United States Patent Office 3,343,663

Patented Sept. 26, 1967

3,343,663

PACKAGE AND LAMINATE THEREOF

Don W. Seidler, Rocky River, Ohio, assignor to The Dow Chemical Company, Midland, Mich., a corporation of Delaware Filed Oct. 24, 1965, Ser. No. 594,964
10 Claims. (Cl. 206—46)

ABSTRACT OF THE DISCLOSURE

A laminate packaging film is composed of a layer of flexible printable material, a polyethylene layer, a biaxially oriented polypropylene layer, a polyethylene layer, a metal foil layer and a polyethylene layer, the layers are adhered together and the composite film is particularly suited for packaging granular hygroscopic materials such as sugar.

This invention relates to an improved package and a laminate for formation of such package. It more particularly relates to a composite laminate suitable for the preparation of a flexible package and a package formed therefrom.

The packaging of granular hygroscopic material in flexible packages has oftentimes proven unsatisfactory because of inadequate protection for the contents of such a package. Granular materials have a tendency during shipping and storage to perforate or puncture the flexible package, and permit moisture vapor to enter the space within the package. Such moisture vapor leads to the liquification of the contents, spoilage thereof and the leakage of the contents onto adjacent packages, frequently rendering them unsatisfactory for sale. Oftentimes soft drinks containing sugar granules, instant coffee and like materials require protection from moisture vapor and protection from visible light. Desirably, a package has an external printable surface.

It is an object of this invention to provide an improved package of hygroscopic granular materials.

It is a further object of this invention to provide an improved package of soft drink concentrate containing granular sugar.

A further object of this invention is to provide a flexible packaging film which provides durability and high strength resistance to puncture, has a printable surface and a heat sealable surface, is a moisture vapor barrier and a barrier to visible light.

These benefits and other advantages in accordance with the present invention are achieved in a composite packaging film comprising a first layer of a flexible material adapted to receive printing, a first layer of polyethylene adhered to the flexible, printable layer, a layer of biaxially oriented polypropylene adhered to the first polyethylene layer, a second layer of polyethylene adhered to the polypropylene layer, a layer of metallic foil adhered to the second polyethylene layer, and a third layer of polyethylene adhered to the metallic foil.

Also contemplated within the scope of the present invention is a package comprising an envelope having at least a first panel and a second panel hermetically sealed together about the periphery and defining a space therebetween, a hygroscopic granular material disposed within the space, each of the panels comprising an outer layer of a flexible printed material, a first layer of polyethylene adhered to the outer layer, a layer of biaxially oriented polypropylene adhered to the first layer of polyethylene, a second layer of polyethylene adhered to the layer of biaxially oriented polypropylene, and a layer of a metallic foil adhered to the second layer of polyethylene and a third or inner layer of polyethylene adhered to the layer of aluminum foil.

Further features and advantages of the present invention become more apparent from the following specification when taken in connection with the drawing wherein.

Figure 1:
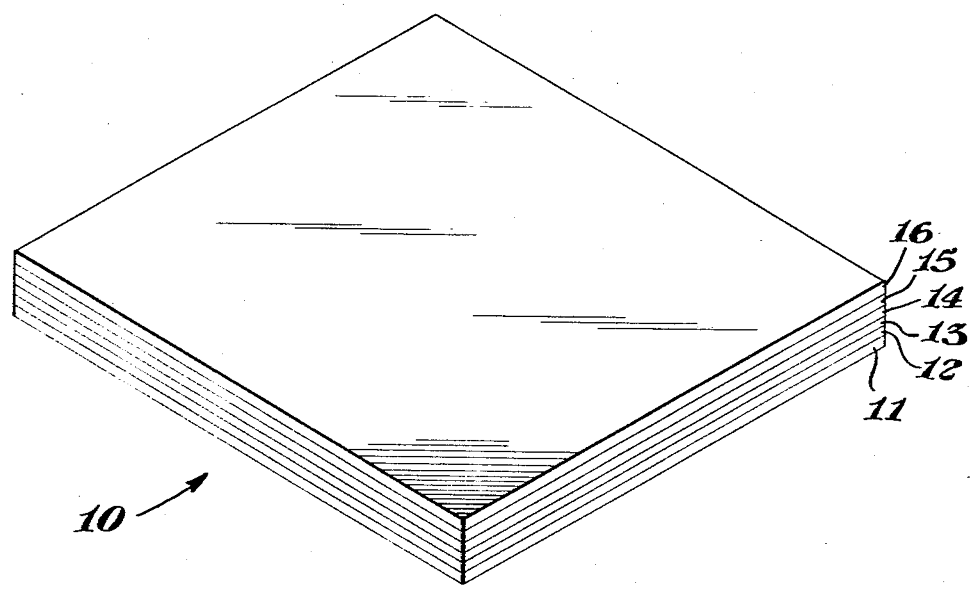
FIGURE 1 is a schematic representation of a multilayer composite packaging film in accordance with the invention.

In FIGURE 1 there is illustrated the composite packaging film in accordance with the present invention, generally described by the reference numeral 10. The packaging film 10 comprises a flexible, printable layer 11 having adhered to one major face thereof a first polyethylene layer 12. A biaxially oriented polypropylene layer 13 is adhered to the first polyethylene layer 12 remote from the cellulosic layer 11. A second polyethylene layer 14 is adhered to the polypropylene layer 13 and is remotely disposed from the first polyethylene layer 12. A metal foil layer 15 is adhered to the second polyethylene layer 14 remote from the polyethylene layer 13. A third polyethylene layer or inner surface 16 is adhered to the foil layer 15.

Beneficially, in preparing laminates in accordance with the present invention, the outer flexible layer or printable layer 11 may be prepared from regenerated cellulose, paper, cellulose acetate, polyester film (polyethylene-terephthalate) or like readily printable material.

Advantageously, the biaxially oriented polypropylene layer is combined with the cellulosic layer by extrusion lamination employing polyethylene as a hot melt adhesive. In such a process, the first polyethylene layer is extruded into a converging nip formed between adjacent nip rolls of which the layer 11 and the biaxially oriented polypropylene 13 pass. The polyethylene in a molten condition is extruded into the nip and the layers 11 and 13 are firmly bonded together by means of the extruded hot melt layer 12. The third polyethylene layer 16 is applied to the aluminum or metallic foil by hot melt extrusion or hot lamination to form a composite of foil and polyethylene equal to the layers 15 and 16. Extrusion lamination employing polyethylene as a hot melt adhesive provides a satisfactory means of joining the polyethylene metal foil to the composite of layers 11, 12 and 13.

If desired, laminates, in accordance with the present invention, may be prepared by contacting a polyethylene layer onto the printable layer and subsequently laminating the biaxially oriented polypropylene layer thereto, a metal foil such as the layer 15 may be coated with the polyethylene on both sides and subsequently heat laminated to the biaxially oriented polypropylene-containing composite. The sequence of lamination is not critical and may be accomplished in any of the conventional manners. However, it is critical that at no time during the formation of the laminate that the temperature is sufficiently high to cause significant shrinkage or deorientation of the polypropylene layer.

Figure 2:
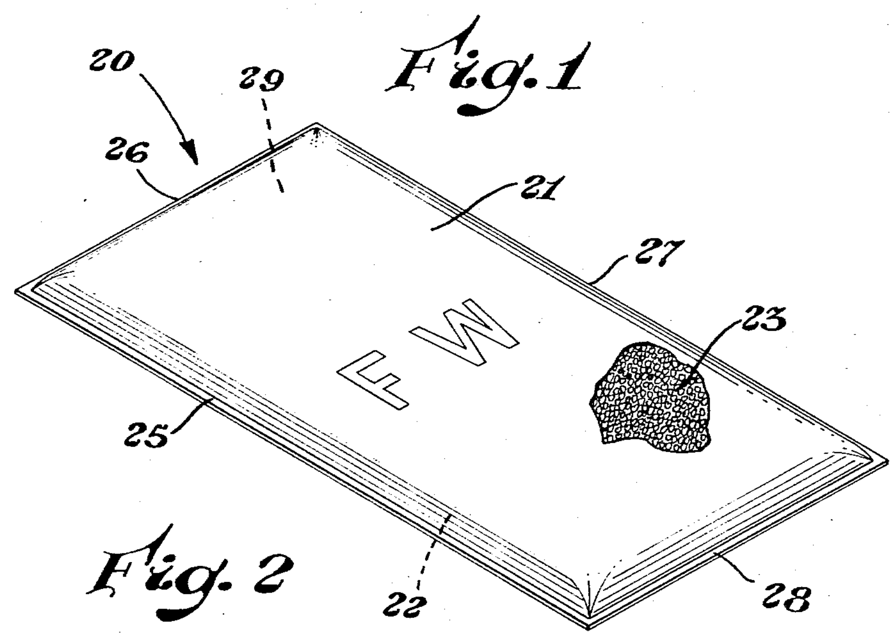
FIGURE 2 is a partly-in-section view of a package in accordance with the invention.

In FIGURE 2 there is illustrated schematically a partly cutaway view of the package in accordance with the present invention generally designated by the reference numeral 20. The package 20 comprises a first panel 21 and a second panel 22 in generally continuing side-by-side relation wherein the outer surface of each of the panels 21 and 22 is the printable layer and the inner surface is the polyethylene layer. A granular hygroscopic material 23 is contained within the package. The panels 21 and 22 are secured to each other by means of peripheral heat seals 25, 26, 27 and 28 wherein the polyethylene layers 16 are secured to each other. The panels 21 and 22 define an internal space 29.

In order to prepare satisfactory flexible packages in accordance with the present invention, the first polyethylene layer desirably has a thickness from about 0.40 to about 1.5 mils, the polypropylene layer has a thickness of from about 0.50 to about 2 mils, the second polyethylene layer has a thickness of about 0.40 to about 1.5 mils, the metallic foil has a thickness of about 0.30 to about 1 mil and beneficially is an aluminum foil, the third polyethylene layer has a thickness of from about 0.70 to about 3 mils, and the printable substrate advantageously has a thickness from about 0.25 to about 6 mils. The thicknesses depend primarily upon the characteristics desired in the resultant package.

The printable layer beneficially is regenerated cellulose such as cellophane or paper which may vary from 12 pound to 100 pound paper, the weight referring to the weight of 500 sheets measuring 24 inches by 36 inches.

Generally thinner laminates, in accordance with the present invention, are employed for relatively small packages, whereas the heavier laminates usually are more desirable for large packages. For example, a laminate wherein the cellulosic layer is 25 pound paper, the first polyethylene layer has a thickness of 0.40 mil, the biaxially oriented polypropylene layer has a thickness of 0.50 mil, the second polyethylene layer has a thickness of 0.40 mil, and 0.35 mil aluminum foil employed with a third polyethylene layer having a thickness of 1.0 mil is eminently suitable for packages containing a granular hygroscopic material such as soft drink mixes having granular sugar therein, in quantities up to about 4 ounces. A thicker laminate such as a laminate wherein the first layer of polyethylene has a thickness of about 1.5 mils, the biaxially oriented polypropylene layer has a thickness of 2 mils, the second polyethylene layer has a thickness of 1.5 mils, a 1 mil aluminum foil layer, and a 3 mil polyethylene layer and 100 pound paper is eminently suited for packaging granular calcium chloride in packages containing as much as 25 pounds. Laminate packages containing hygroscopic granules in accordance with the invention are remarkably resistant to breakage and abrasion and resist exceptionally well shipping and storage.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention excepting as it is set forth and defined in the hereto appended claims.

What is claimed is:

1. A composite packaging film comprising a first layer of a flexible material adapted to receive printing, a first layer of polyethylene adhered to the flexible, printable layer, a layer of biaxially oriented polypropylene adhered to the first polyethylene layer, a second layer of polyethylene adhered to the polypropylene layer, a layer of metallic foil adhered to the second polyethylene layer, and a third layer of polyethylene adhered to the metallic foil, the layers of the laminate being adhered together with a strength equivalent to that obtained by extrusion lamination.

2. The film of claim 1, wherein the printable layer is regenerated cellulose, paper, cellulose acetate or polyethyleneterephthalate.

3. The film of claim 1, wherein the first and second polyethylene layers have a thickness of from about 0.4 to about 1.5 mils.

4. The film of claim 1, wherein the polypropylene layer has a thickness of from about 0.5 to about 2 mils and the third polyethylene layer has a thickness of from about 0.5 to about 3 mils.

5. The film of claim 1, wherein the first layer has a thickness of from about 0.25 to about 5 mils.

6. A package comprising an envelope having at least a first panel and a second panel hermetically sealed together about the periphery and defining a space therebetween, a hydroscopic granular material disposed within the space, each of the panels comprising an outer layer of a flexible printed material, a first layer of polyethylene adhered to the outer layer, a layer of biaxially oriented polypropylene adhered to the first layer of polyethylene, a second layer of polyethylene adhered to the layer of biaxially oriented polypropylene, a layer of metallic foil adhered to the second layer of polyethylene and a third, or inner layer, of polyethylene adhered to the layer of aluminum foil.

7. The package of claim 6, containing granular sugar.

8. The package of claim 6, wherein the outer layer is printed regenerated cellulose, paper, cellulose acetate or polyethyleneterephthalate having a thickness of from about 0.25 to about 6 mils, the first polyethylene layer has a thickness of from about 0.4 to about 1.5 mils, the polypropylene layer has a thickness of from about 0.5 to about 2 mils, the second polyethylene layer has a thickness of from about 0.4 to about 1.5 mils, the metallic foil has a thickness of about 0.3 to about 1 mil, the third polyethylene layer has a thickness of from about 0.7 to about 3 mils.

9. The package of claim 6, wherein the metallic foil is aluminum foil.

10. The package of claim 6, wherein the printed layer is regenerated cellulose.

References Cited

UNITED STATES PATENTS

| | | | |
|---|---|---|---|
| 2,679,969 | 6/1954 | Kichter | 229—35 |
| 3,136,468 | 6/1964 | Keller | 229—3.5 |
| 3,221,873 | 12/1965 | Bowes | 206—65.3 |
| 3,246,061 | 4/1966 | Blatz | 161—402 |
| 3,274,004 | 9/1966 | Curler. | |

LOUIS G. MANCENE, *Primary Examiner.*